United States Patent
Mashburn et al.

(10) Patent No.: US 10,760,331 B2
(45) Date of Patent: Sep. 1, 2020

(54) SEALING DEVICE AND METHOD OF INSTALLATION

(71) Applicant: QUICK FIX SOLUTIONS, INC., Cornelius, NC (US)

(72) Inventors: Andrew Allen Mashburn, Cornelius, NC (US); John David Wells, Cornelius, NC (US)

(73) Assignee: QUICK FIX SOLUTIONS, INC, Cornelius, NC (US)

( * ) Notice: Subject to any disclaimer, the term of this patent is extended or adjusted under 35 U.S.C. 154(b) by 0 days.

(21) Appl. No.: 15/568,991

(22) PCT Filed: Apr. 22, 2016

(86) PCT No.: PCT/US2016/028847
§ 371 (c)(1),
(2) Date: Oct. 24, 2017

(87) PCT Pub. No.: WO2016/172483
PCT Pub. Date: Oct. 27, 2016

(65) Prior Publication Data
US 2018/0128041 A1 May 10, 2018

Related U.S. Application Data

(60) Provisional application No. 62/152,666, filed on Apr. 24, 2015.

(51) Int. Cl.
*E06B 7/232* (2006.01)
*E06B 7/23* (2006.01)
(Continued)

(52) U.S. Cl.
CPC .......... *E06B 7/2312* (2013.01); *F16J 15/025* (2013.01); *F16J 15/027* (2013.01); *F16J 15/061* (2013.01)

(58) Field of Classification Search
CPC ...... E06B 7/2312; F16J 15/025; F16J 15/027; F16J 15/061
(Continued)

(56) References Cited

U.S. PATENT DOCUMENTS 5,001,867 A 3/1991 Dupuy
5,408,784 A * 4/1995 Wruck .................... E06B 3/308
49/489.1
(Continued)

FOREIGN PATENT DOCUMENTS

DE 102005045298 A1 4/2007

OTHER PUBLICATIONS

International Search Report for International Patent Application No. PCT/US2016/028847 dated Aug. 8, 2016.
(Continued)

*Primary Examiner* — Jerry E Redman
(74) *Attorney, Agent, or Firm* — Moore & Van Allen PLLC; Henry B. Ward, III

(57) ABSTRACT

A device for sealing an aperture defined between a first object and second object is provided. The device comprises a first sealing member and a second sealing member. The first sealing member comprising a base member and first, second and third sealing portions. The base member has first and second sides and a surface extending therebetween. The first sealing portion extends from the first side of the base member. A first attachment portion extends along at least a portion of the surface of the base member. The second sealing portion extends from the second side of the base member and is configured to conform to and seal the gap. The third sealing portion extends from the second sealing portion and defines a distal end structured to conform to and form a seal the exterior surface of the second object. The second sealing member comprising a backing member and
(Continued)

second attachment portion. The backing member comprising a first and second surface, wherein the first surface comprises an adhesive structured to attach to the first object. The second attachment portion extending along at least a portion of the second surface of the backing member, and being configured to matingly engage the first attachment portion to thereby secure the first sealing member to the second sealing member and to thereby sealing engage the second sealing portion at least partially within the gap and sealing engage the distal end of the third sealing member with the exterior of the second object.

20 Claims, 15 Drawing Sheets

(51) Int. Cl.
  *F16J 15/02* (2006.01)
  *F16J 15/06* (2006.01)

(58) Field of Classification Search
  USPC ................................ 49/495.1, 498.1, 496.1
  See application file for complete search history.

(56) References Cited

U.S. PATENT DOCUMENTS

| | | | |
|---|---|---|---|
| 5,449,544 A | 9/1995 | Ogawa et al. | |
| 5,634,644 A * | 6/1997 | Guillon | B60J 10/235 277/641 |
| 5,918,421 A * | 7/1999 | Nozaki | B60J 10/24 49/475.1 |
| 6,082,048 A | 7/2000 | Backes et al. | |
| 6,820,372 B2 * | 11/2004 | Nozaki | B60J 10/24 49/492.1 |
| 7,083,222 B2 * | 8/2006 | Oda | B60J 10/30 296/146.9 |
| 8,136,279 B1 | 3/2012 | Nearman | B29C 37/0082 277/609 |
| 8,312,675 B2 * | 11/2012 | Thiele | E05F 15/42 49/27 |
| 8,667,739 B2 * | 3/2014 | Brookman | E06B 7/23 49/495.1 |
| 8,991,102 B2 * | 3/2015 | Minagawa | B60J 10/86 49/479.1 |
| 9,038,319 B2 * | 5/2015 | Kuwabara | B60J 10/048 49/498.1 |
| 9,676,261 B2 * | 6/2017 | Krueger | B60J 10/35 |
| 2001/0034978 A1 * | 11/2001 | Iimori | B60J 10/24 49/490.1 |
| 2002/0144466 A1 * | 10/2002 | Gopalan | B60J 10/17 49/475.1 |
| 2005/0057058 A1 | 3/2005 | Willet | |
| 2005/0081450 A1 | 4/2005 | Zwolinski et al. | |
| 2005/0103385 A1 * | 5/2005 | Takahashi | B67D 7/42 137/540 |
| 2006/0162258 A1 * | 7/2006 | Yamashita | B60J 10/24 49/495.1 |
| 2007/0000180 A1 * | 1/2007 | Oba | B60J 10/24 49/498.1 |
| 2007/0137112 A1 * | 6/2007 | Furuzawa | B60J 10/24 49/489.1 |
| 2007/0227072 A1 * | 10/2007 | Kawase | B60J 10/36 49/377 |
| 2007/0245634 A1 * | 10/2007 | Oba | B60J 10/248 49/498.1 |
| 2007/0251153 A1 * | 11/2007 | Oba | B60J 10/24 49/498.1 |
| 2009/0313900 A1 | 12/2009 | Foster | |
| 2012/0023829 A1 * | 2/2012 | Happel | E06B 7/2307 49/479.1 |
| 2012/0304543 A1 * | 12/2012 | Preising, Jr. | E06B 7/2314 49/495.1 |
| 2014/0097578 A1 * | 4/2014 | Young | F16J 15/027 277/628 |
| 2014/0203522 A1 * | 7/2014 | Ksiezopolski | F16J 15/022 277/634 |
| 2014/0223830 A1 * | 8/2014 | Shigehiro | E06B 7/23 49/495.1 |
| 2014/0352225 A1 | 12/2014 | Kast et al. | |
| 2016/0003358 A1 * | 1/2016 | Young | F16J 15/027 277/645 |
| 2018/0043844 A1 * | 2/2018 | Ksiezopolski | F16J 15/027 |

OTHER PUBLICATIONS

Written Opinion for International Patent Application No. PCT/US2016/028847 dated Aug. 8, 2016.
"Penny's Tuppence (2 cents in Brit)" http://pennys-tuppence.blogspot.com/2013/07/diy-rv-journey-mh-co-detector-rotten.html (Probst) Jul. 11, 2013 (Jul. 11, 2013), entire document, especially p. 7.

* cited by examiner

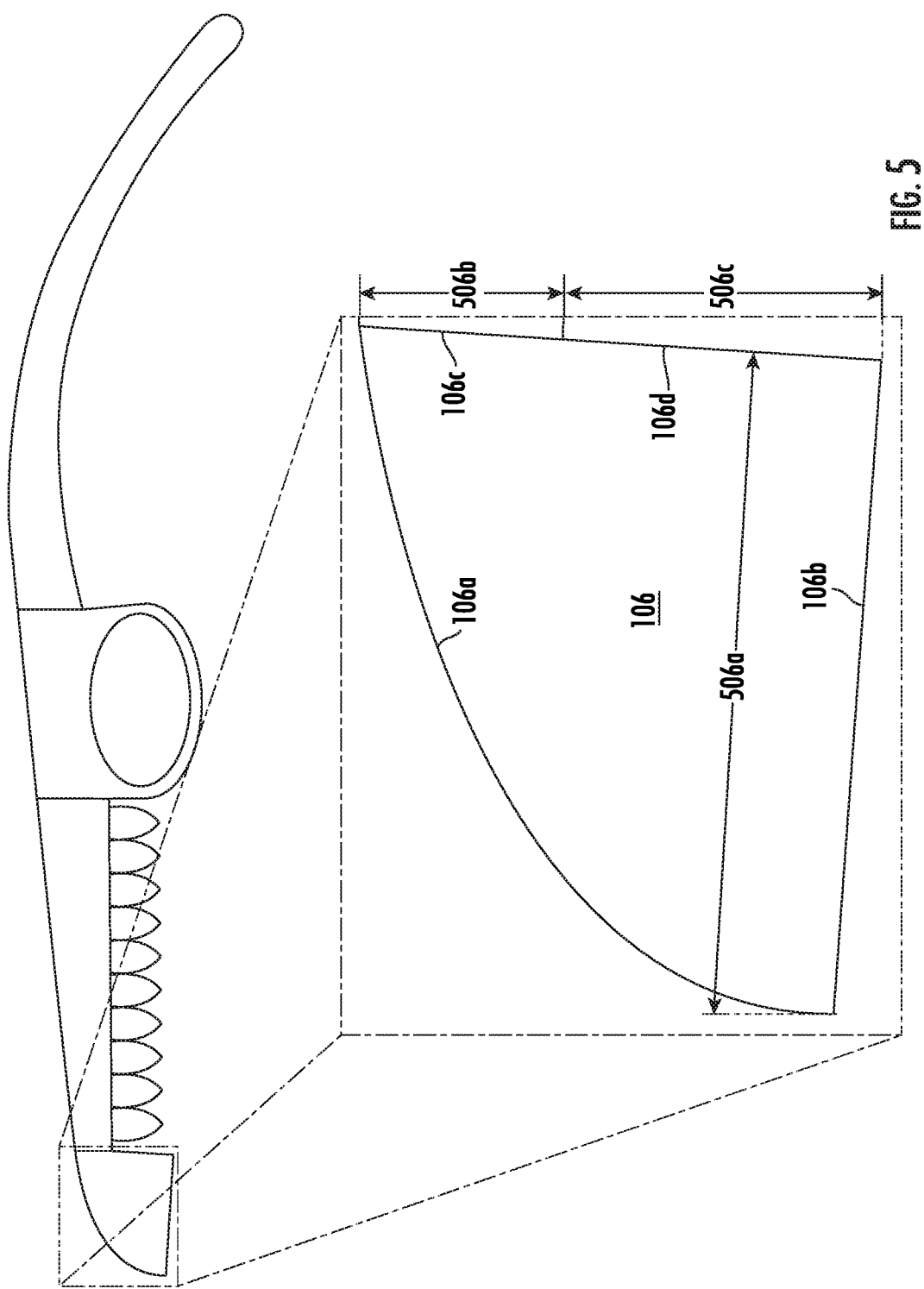

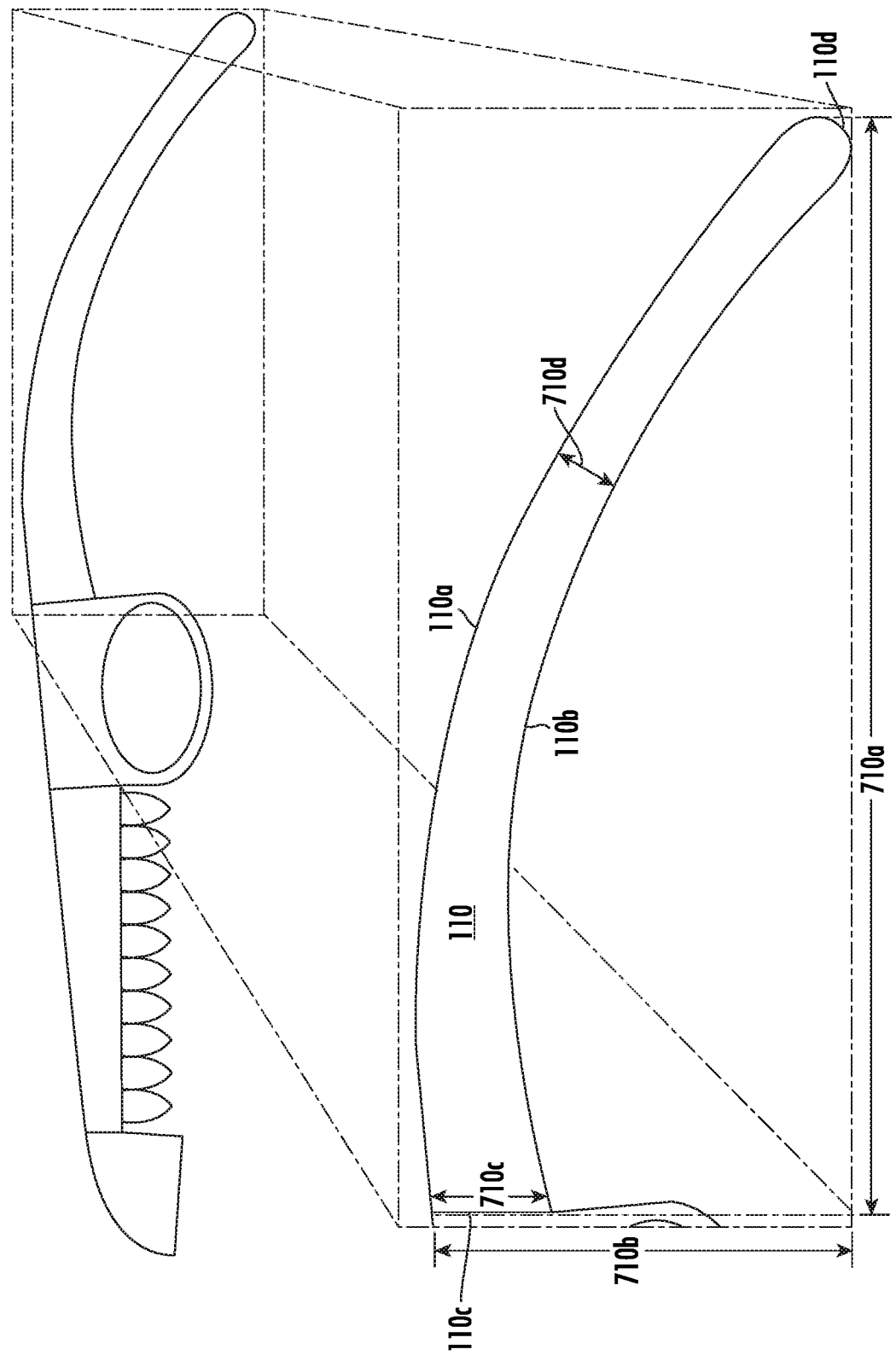

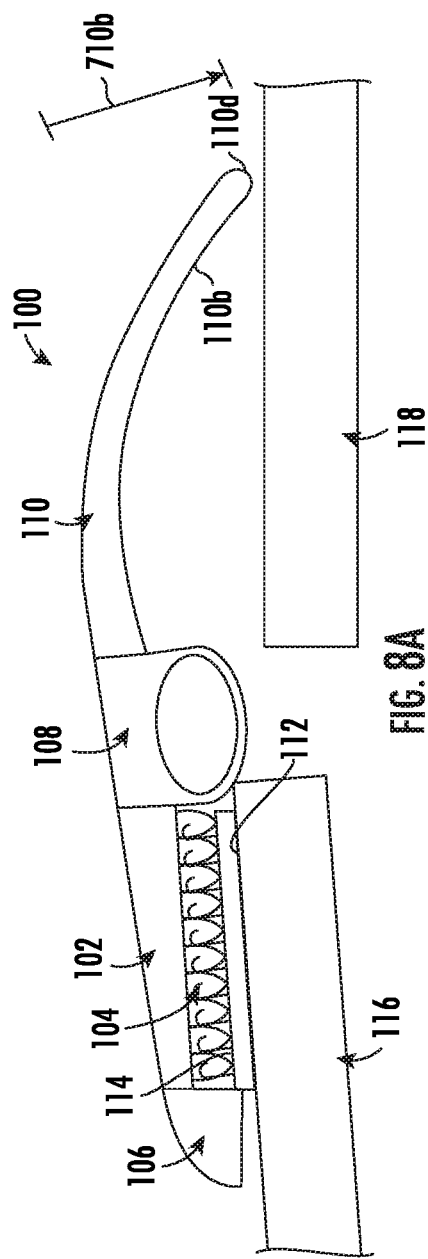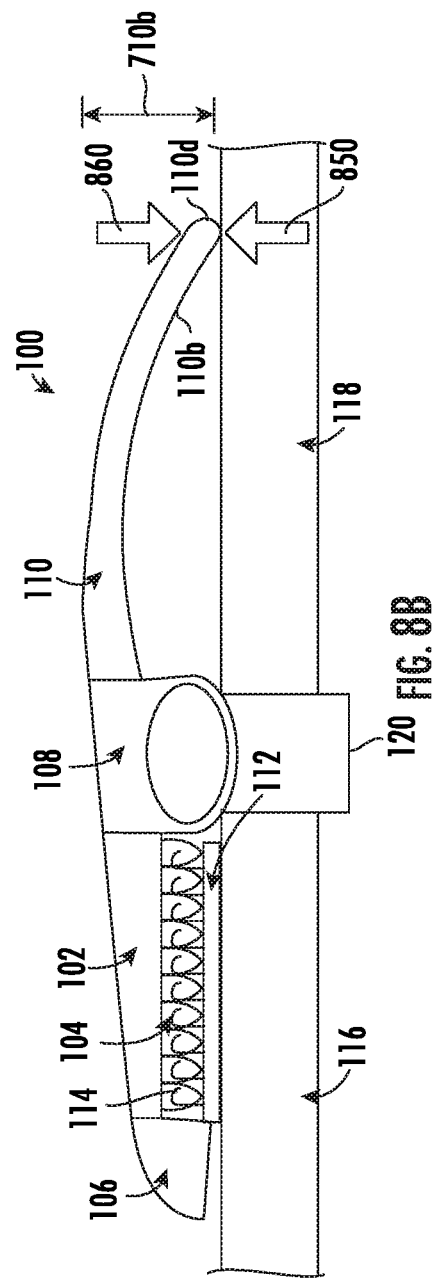

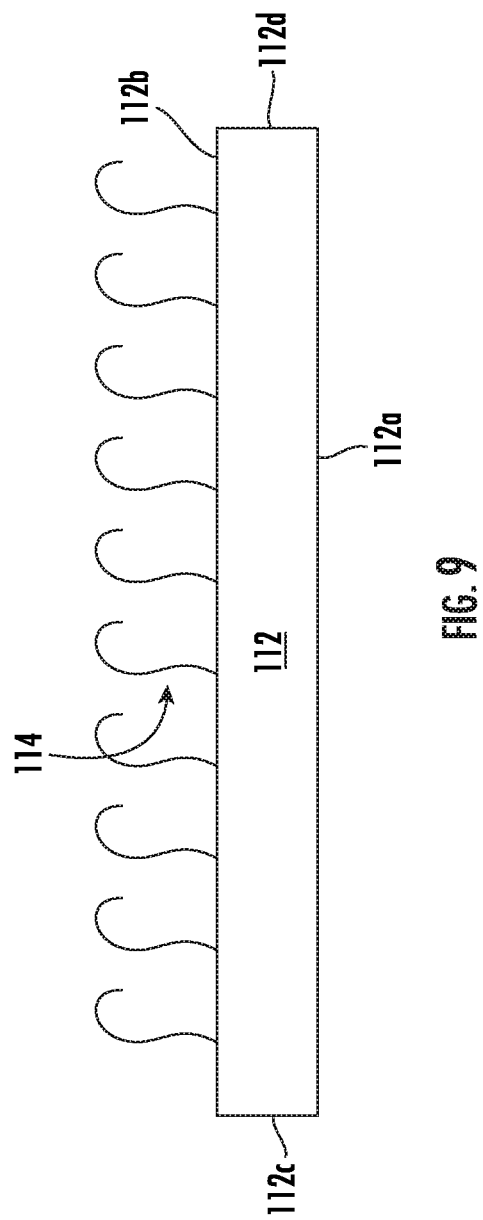

SEALING DEVICE AND METHOD OF INSTALLATION

TECHNICAL FIELD

This invention relates generally to sealing device, such as weather stripping for a door or window, to prevent the transfer of air, noise, light, energy, and odors through an aperture, space or gap between an access member, such as a door or window, and the adjacent frame.

BACKGROUND

Many doors and windows do not properly fit with their respective frames, causing apertures, spaces or gaps that allow cool air, warm air, noise, light, energy, and odor to pass into a building or between rooms. Thus, a need exists for a sealing device that can be easily applied to a door or window frame for sealing such apertures, spaces or gaps.

BRIEF SUMMARY

Embodiments of the present invention relate to a sealing device having two members. A first member comprises a base member, a first attachment portion, a first sealing portion, a sealing member, and a third sealing portion. The second member comprises a backing member and a second attachment portion. The second member may be cut into a predetermined configuration and positioned around at least a portion of a door or window. The first member may then be cut into the same configuration, attached to the second member via the first and second attachment portions to seal the aperture between the door or window and its respective frame.

BRIEF DESCRIPTION OF THE DRAWINGS

Having thus described embodiments of the invention in general terms, reference will now be made to the accompanying drawings.

Figure 1:
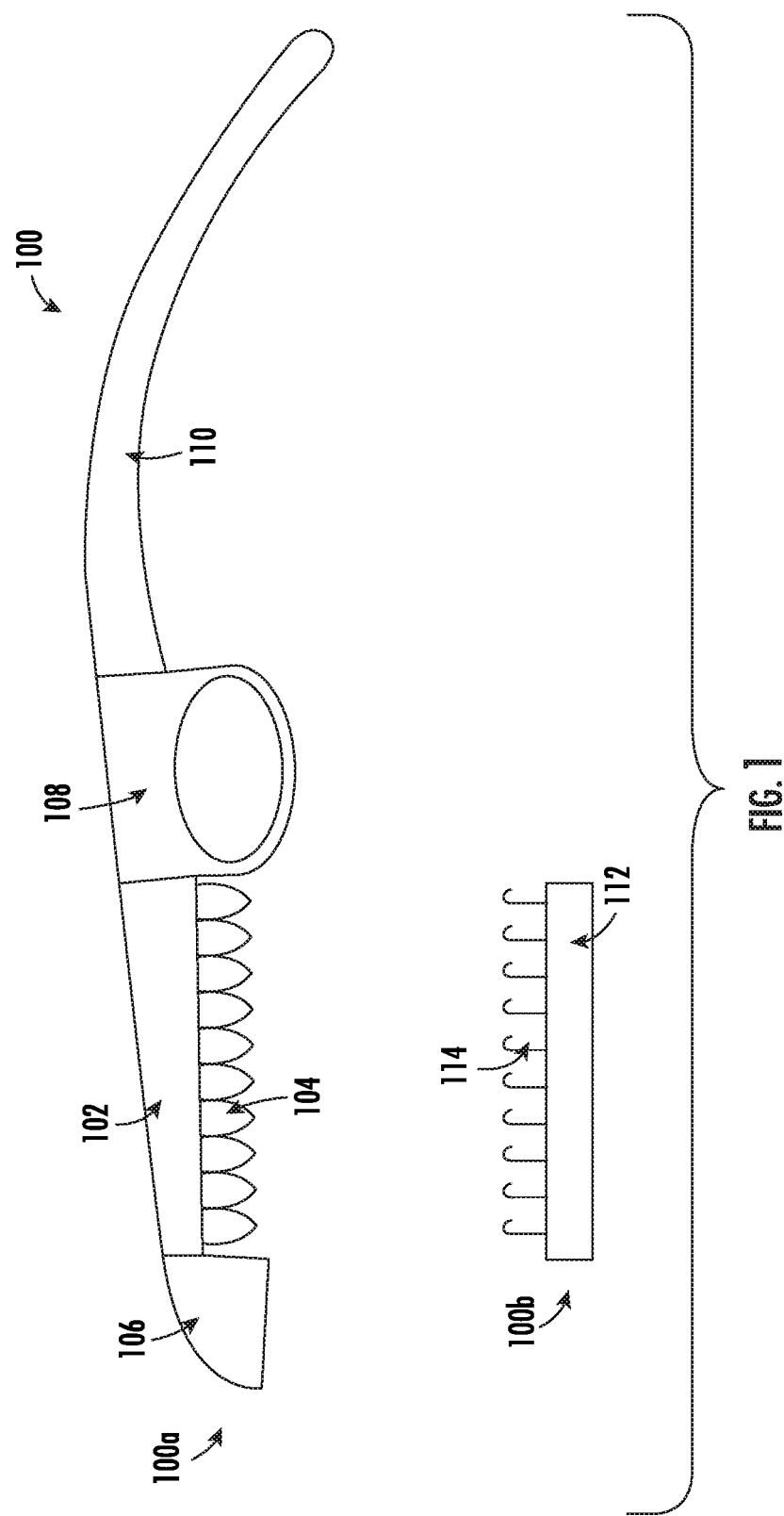
Figure 2:
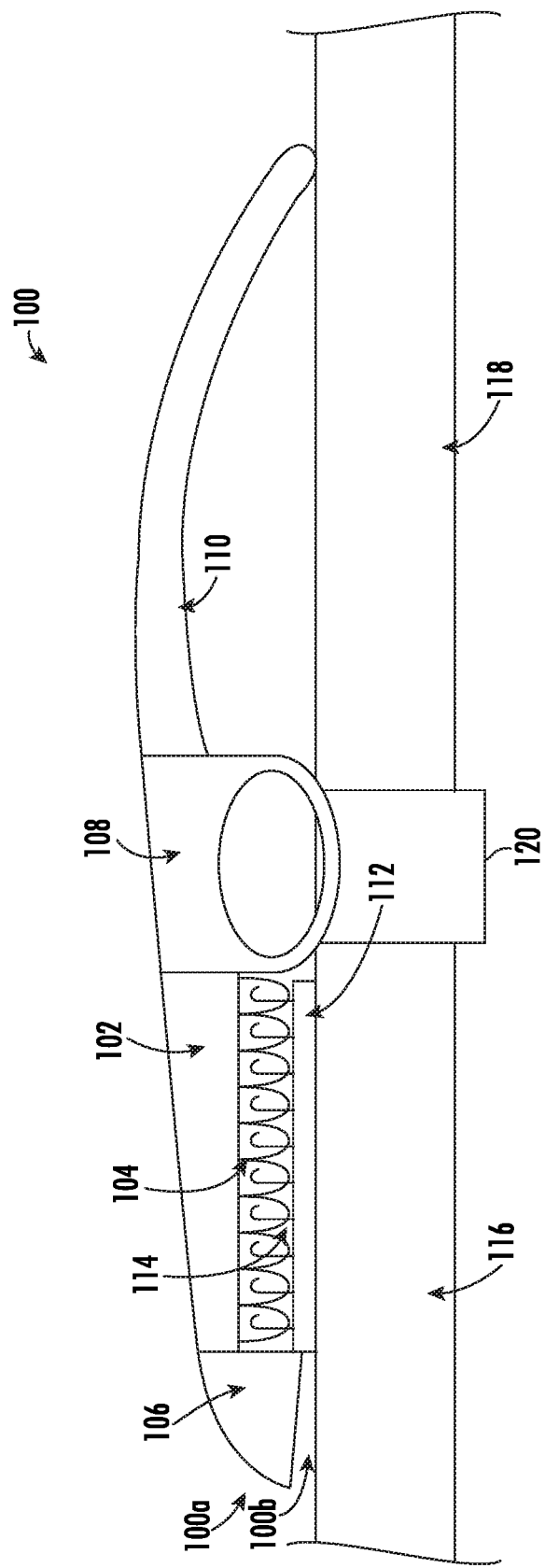
Figure 3:
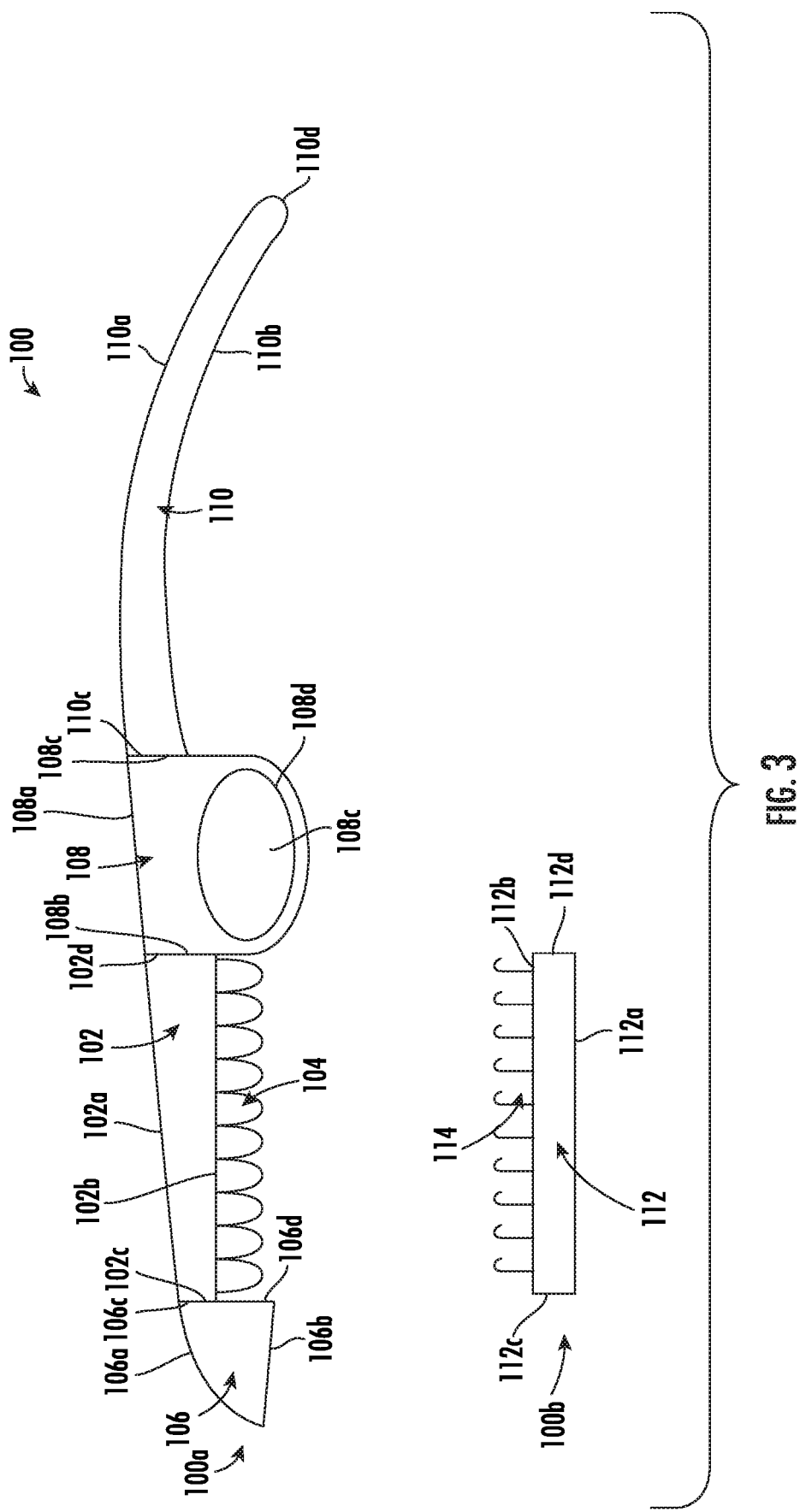
Figure 4:
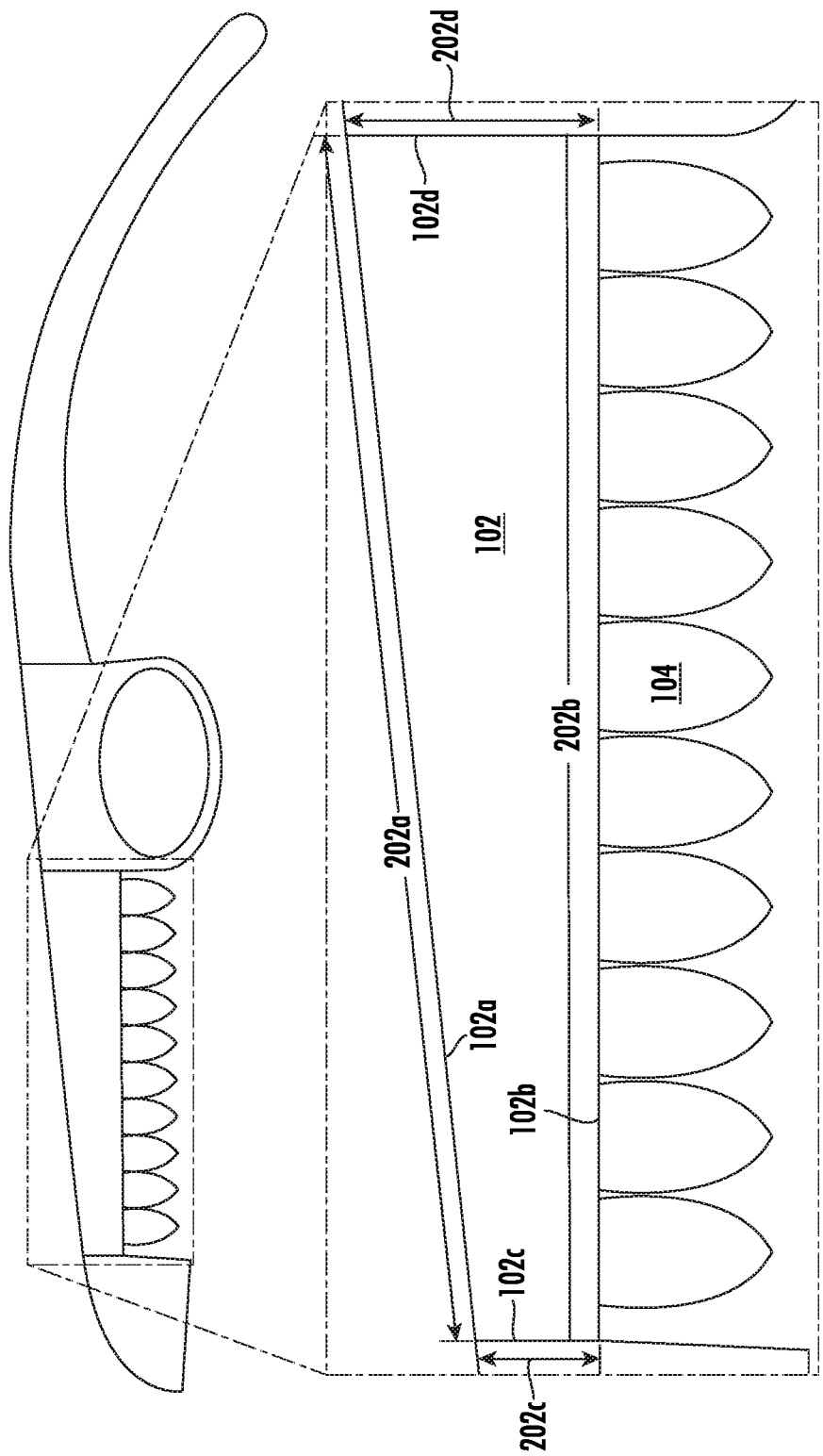
Figure 6A:
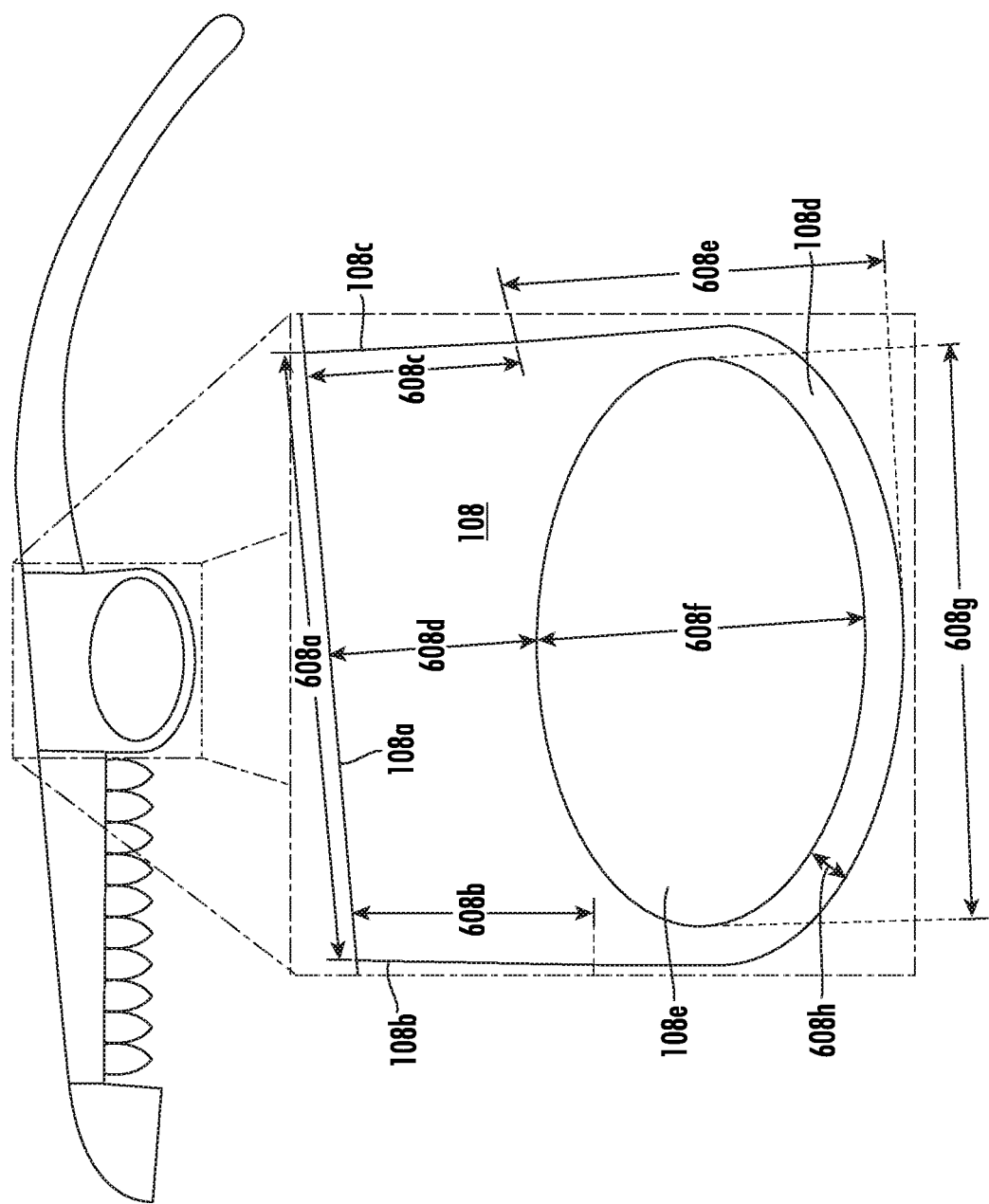
Figure 6B:
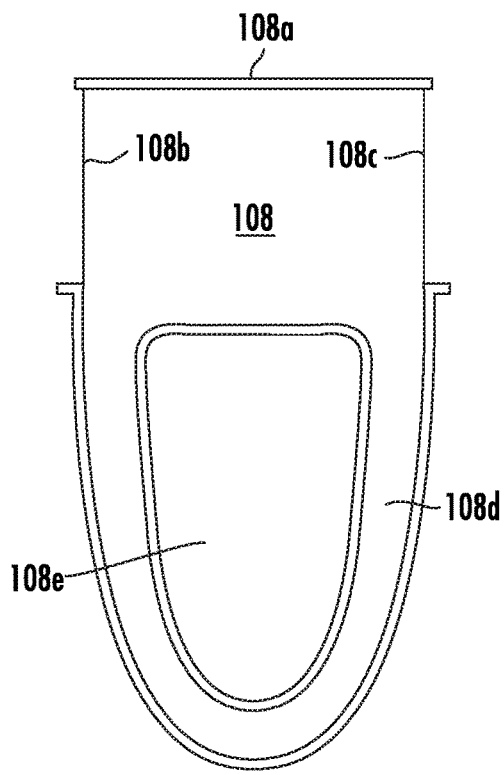
Figure 6C:
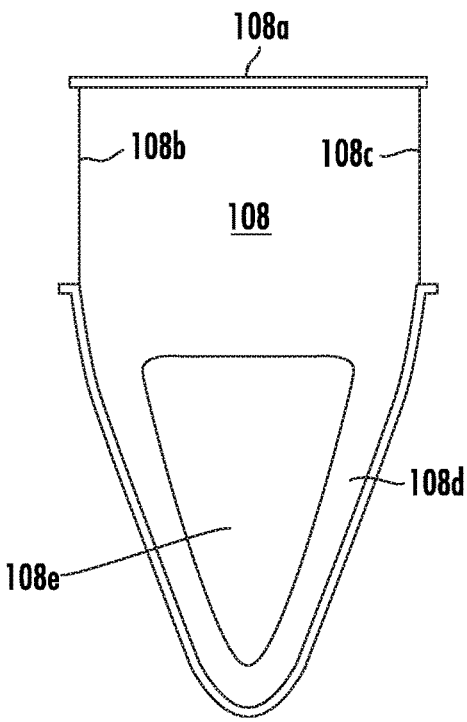
Figure 6D:
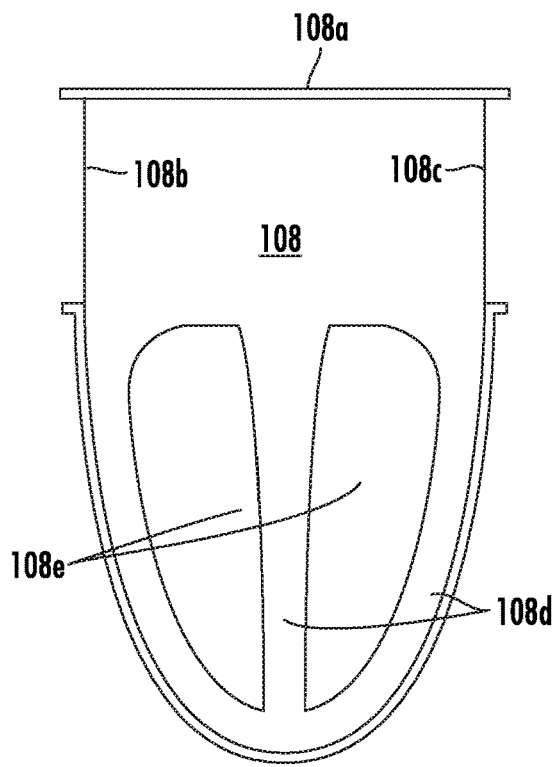
Figure 10:
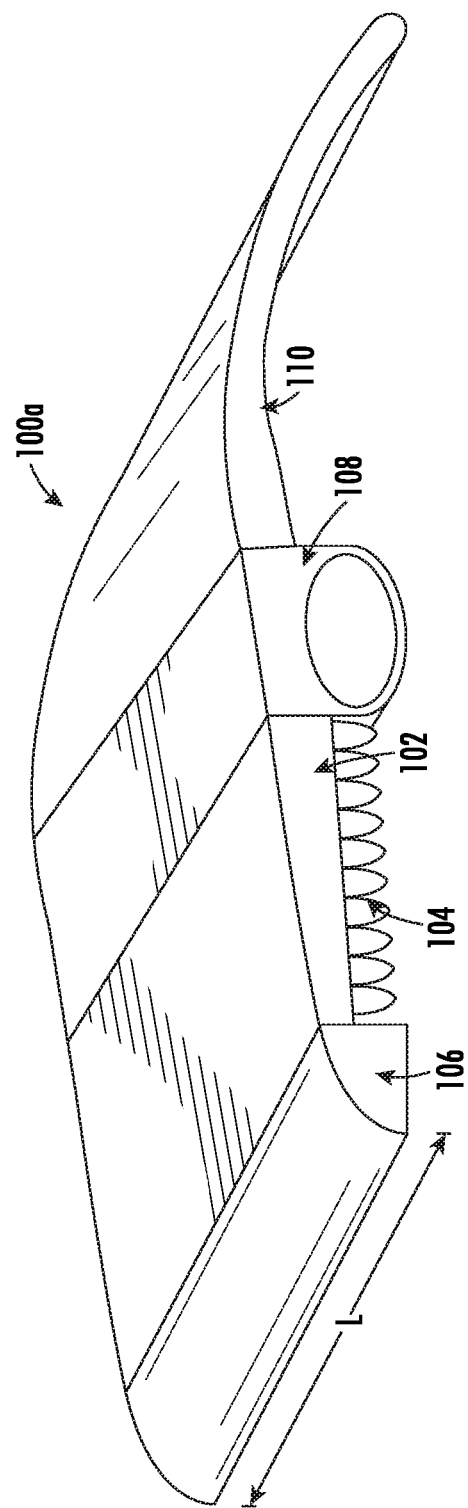
Figure 11:
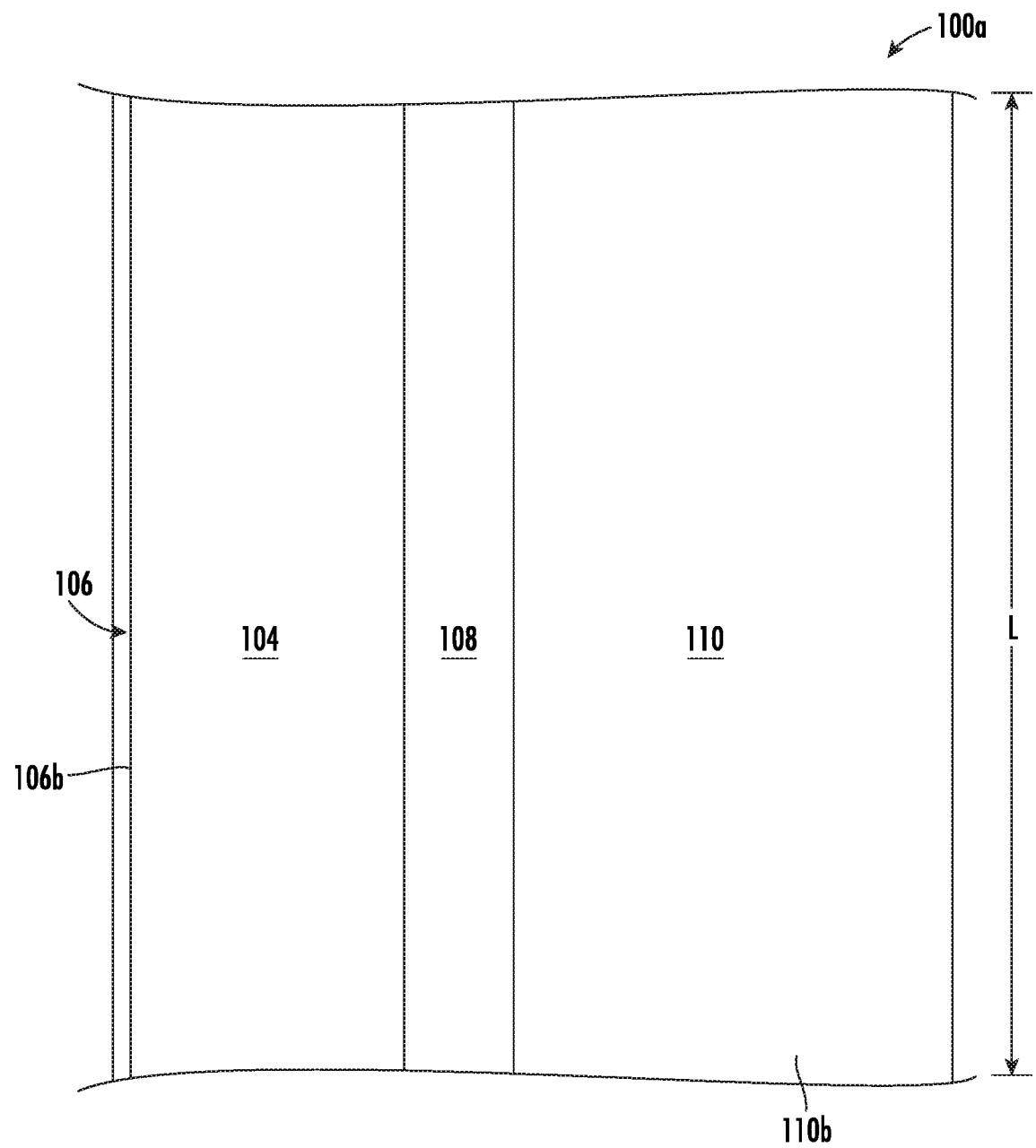
Figures 12A, 12B:
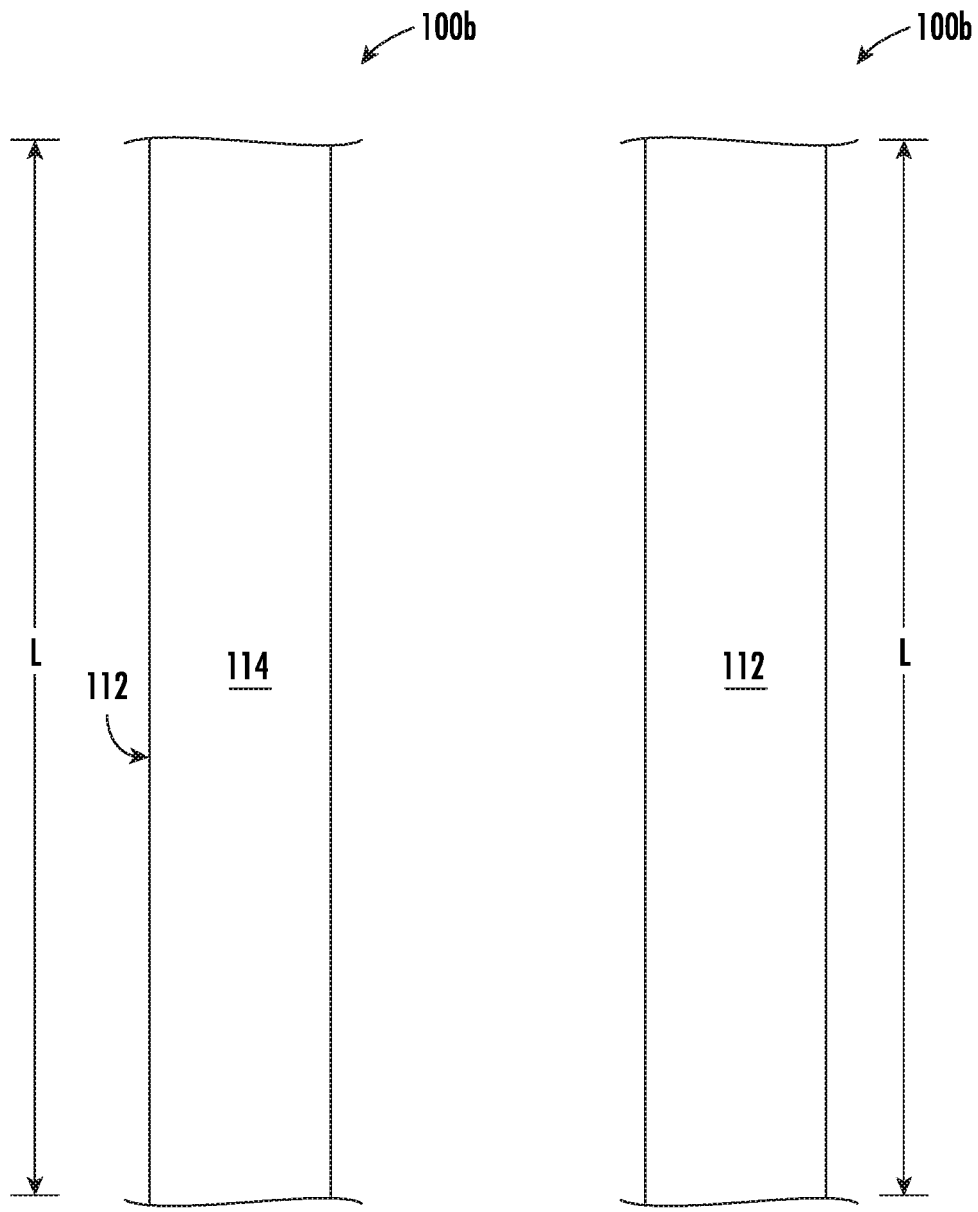
Figure 13:
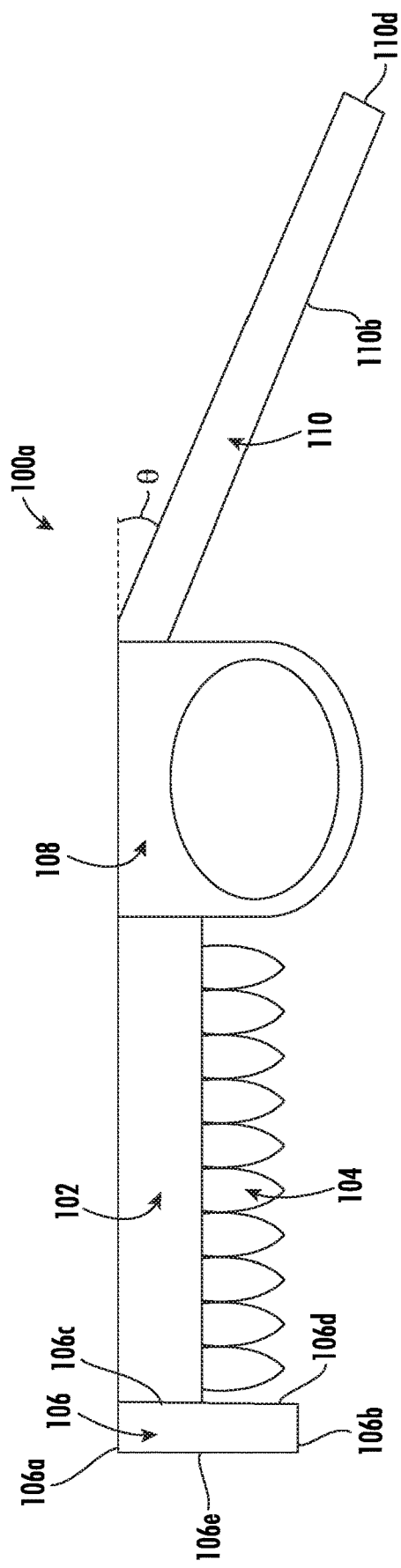
Figure 14:
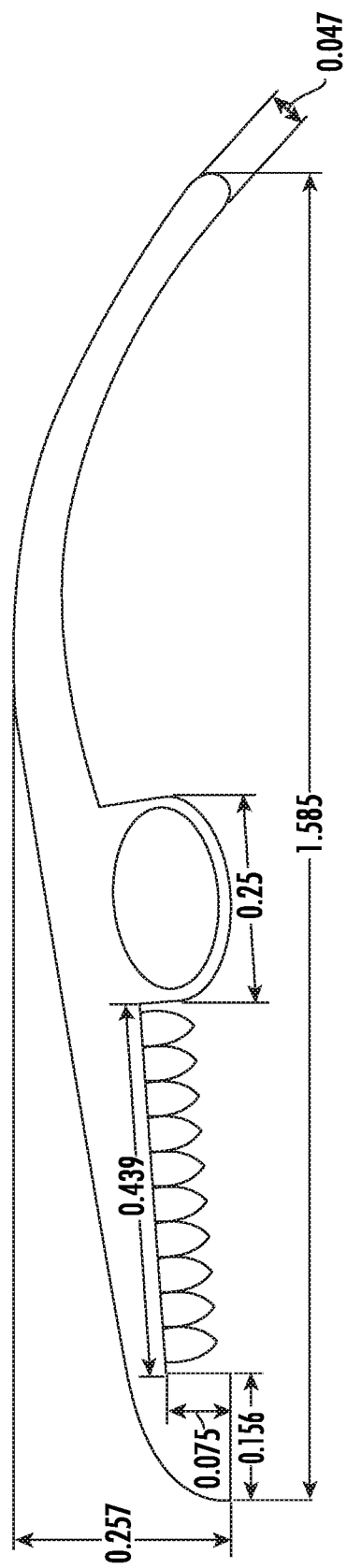

FIG. 1 is a cut-away view illustrating a sealing device, in accordance with one embodiment of the invention;

FIG. 2 is a cut-away view illustrating a sealing device in a closed position, in accordance with one embodiment of the invention;

FIG. 3 is a cut-away view illustrating the sealing device illustrated in FIG. 2;

FIG. 4 is a cut-away view illustrating a base member of a sealing device, in accordance with one embodiment of the invention;

FIG. 5 is a cut-away view illustrating first sealing portion of a sealing device, in accordance with one embodiment of the invention;

FIG. 6A is a cut-away view illustrating a sealing member of a sealing device, in accordance with one embodiment of the invention;

FIG. 6B is a cut-away view illustrating an alternate configuration of a sealing member of a sealing device, in accordance with one embodiment of the invention;

FIG. 6C is a cut-away view illustrating an alternate configuration of a sealing member of a sealing device, in accordance with one embodiment of the invention;

FIG. 6D is a cut-away view illustrating an alternate configuration of a sealing member of a sealing device, in accordance with one embodiment of the invention;

FIG. 7 is a cut-away view illustrating a third sealing portion of a sealing device, in accordance with one embodiment of the invention;

FIG. 8A is a cut-away view illustrating a sealing device in an open position, in accordance with one embodiment of the invention;

FIG. 8B is a cut-away view illustrating a sealing device in a closed position, in accordance with one embodiment of the invention;

FIG. 9 is a cut-away view illustrating a second sealing member, in accordance with embodiments of the invention;

FIG. 10 is a top perspective view illustrating a first sealing member, in accordance with embodiments of the invention;

FIG. 11 is a bottom perspective view illustrating a first sealing member, in accordance with one embodiment of the invention;

FIG. 12A is a top perspective view illustrating a second sealing member, in accordance with one embodiment of the invention;

FIG. 12B is a bottom perspective view illustrating a second sealing member, in accordance with one embodiment of the invention;

FIG. 13 is a cut-away view illustrating a first sealing member, in accordance with one embodiment of the invention; and FIG. 14 is a cut-away view illustrating a first sealing member, in accordance with one embodiment of the invention.

DETAILED DESCRIPTION OF EMBODIMENTS OF THE INVENTION

Embodiments of the present invention may now be described more fully hereinafter with reference to the accompanying drawings, in which some, but not all, embodiments of the invention are shown. Indeed, the invention may be embodied in many different forms and should not be construed to the embodiments set forth herein; rather, these embodiments are provided so that this disclosure may satisfy applicable legal requirements. Like numbers refer to like elements throughout.

Turning now to the drawings, attention is first directed to FIG. 1 in which is seen a cut-away view illustrating a sealing device, generally designated by the reference number 100. The sealing device comprises a first sealing member 100a and a second sealing member 100b. The first sealing member 100a includes a base member 102, a first attachment portion 104, a first sealing portion 106, a second sealing portion 108, and a third sealing portion 110. The second sealing member 100b includes a backing member 112 and a second attachment portion 114.

FIG. 2 illustrates a cross-cut view of a closed configuration of the sealing device 100, and its positioning relative to a first object 116, a second object 118, and a gap 120. As illustrated in FIG. 2, the backing member 112 is designed to be secured along the exterior surface and adjacent the edge of the first object 116 (e.g., a door, window or other access member), such that when the first attachment portion 112 engages the second attachment portion 114, the second sealing portion 108 is positioned over and at least partially within the gap 120 and the third sealing portion 110 extends over the edge and exterior surface of the second object 118 (e.g., a door, window or other frame or frame member) to create a seal that blocks or reduces the passing of air, noise, odor, energy, and light through the gap 120. The sealing device 100 may be packaged in long strips that may subsequently be shaped or configured by a user to fit the dimensions of the first object 116. The sealing device 100 may be positioned along the edges of any door, window, air vent, garage door, or other enclosure with an access member, and the frames of such objects.

By creating a seal between the first and second objects 116, 118, the device 100 may block air from passing through the gap 120 when in a closed position. By blocking or restricting air flow through the gap 120, the sealing device 100 may help to keep cool air out of a warm room, warm air out of a cool room, and substantially reduces, if not eliminates, air flow through the gap 120. By substantially reducing, if not eliminating, air flow through the gap 120, the sealing device 100 also serves as an insulator, substantially reducing the amount of thermal energy that passes through the gap 120. In one embodiment, the sealing device 100 is constructed at least partially of a material that is flexible and has a low thermal conductivity. Additionally, by substantially reducing, if not eliminating, air flow through the gap 120, the device 100 prevents unwanted odors from passing through the gap 120. The device 100 can also provide a noise dampening function, disrupting sound waves that would normally pass unimpeded through the gap 120, such that the decibel level is decreased on the other side of the device 100 from the noise source. Finally, ambient light from outside can also pass through a having a gap 120 between the first and second objects 116, 118. The sealing device 100 may therefore be comprised of an opaque material such that light is prevented by the sealing device from passing through the gap 120.

FIG. 3 illustrates an exploded, cut-away side view of the sealing device 100 illustrated in FIG. 2. As shown in FIG. 3, the sealing device 100 generally comprises a first sealing member 100a and a second sealing member 100b. The first sealing member 100a includes a base member 102, a first attachment portion 104, a first sealing portion 106, a second sealing portion 108, a third sealing portion 110. The second sealing member 100b includes a backing member 112 and a second attachment portion 114. The base member 102 comprises a first surface 102a, a second surface 102b, a first side 102c, and a second side 102d. The first sealing portion 106 comprises a first surface 106a, a second surface 106b, a first side 106c, and a first side extension 106d. The second sealing portion 108 comprises a first surface 108a, a first side 108b, a second side 108c, a sealing end 108d, and an enclosure 108e. The third sealing portion 110 comprises a first surface 110a, a second surface 110b, a first side 110c, and a second side 110d. The backing member 112 of the second sealing member 100b comprises a first surface 112a, a second surface 112b, a first side 112c, and a second side 112d.

Regarding the base member 102, the second surface 102b is secured to the first attachment portion 104. In some embodiments, the second surface 102b may be secured to the first attachment portion 104 by means of an adhesive, fasteners, staples, sewing, and the like. Alternatively, the first attachment portion 104 can be formed integrally with the second surface 102b of the base member 102. The first side 102c of the base member 102 is connected to the first side 106c of the first sealing portion 106. In some embodiments, the first side 102c of the base member 102 is attached to the first side 106c of the first sealing portion 106 by an adhesive. In other embodiments, the first side 102c of the base member 102 and the first side 106c of the first sealing portion 106 are connected as a continuous section of material or, in other words, are integrally formed. The second side 102d of the base member 102 is connected to the first side 108b of the second sealing portion 108. In some embodiments, the second side 102d of the base member 102 is attached to the first side 108b of the second sealing portion 108 by an adhesive. In other embodiments, the second side 102d of the base member 102 and the first side 108b of the second sealing portion 108 are connected as a continuous section of material or, in other words, are integrally formed. In some embodiments, the first surface 102a of the base member 102 is substantially planar. In other embodiments, the first surface 102a of the base member 102 is curved to conform to an appearance of a continuous curvilinear surface between the first surface 106a of the first sealing portion 106 and the first surface 108a of the second sealing portion 108. The second surface 102b of the base member 102 is substantially planar. In one embodiment, the first side 102c of the base member 102 and the second side 102d of the base member 102 are perpendicular to the second surface 102b of the base member 102.

As illustrated in FIG. 4, in one embodiment, the base member 102 has a first width 202a along the first side 102a, a second width 202b along the second side 202b, a first depth 202c along the first side 102c, and a second depth 202b along the second side 102d. In some embodiments, the first depth 202c and the second depth 202d are of equal lengths, and the base member 102 is substantially of a rectangular shape. In such an embodiment, the first width 202a and the second width 202b are substantially equal in length. In some embodiments, the first depth 202c is smaller than the second depth 202d, and the resulting base member 102 is substantially tapered toward the first side 102c. In some embodiments, the first depth 202c is larger than the second depth 202d, and the resulting base member 102 is substantially tapered toward the second side 102d. In such embodiments, the first width 202a is longer than the second width 202b when the first side 102c and the second side 102d are positioned perpendicular to the second surface 102b, as previously described.

The base member 102 of the first sealing member 100a is preferably constructed of a resilient, yet flexible material. In certain embodiments, the base member 102 of the first sealing member 100a is constructed of an elastomer, such as an SBS rubber, polyurethane, polyisoprene (natural rubber), neoprene, polyisobuylene, vinyl, PVC or other plastic. The base member 102 supports or is load sharing with the first sealing portion 106, the first attachment portion 104, and the second sealing member 108, so the base member 102 must be constructed using an elastomeric material of sufficient hardness or durometer to support these components. Therefore, in certain embodiments, the base member 102 has a hardness described by a procedure ASTM 2240 (American Society of Testing and Materials) using the Shore A scale, wherein the hardness of the base member 102 is from approximately 30 to approximately 70, and, more preferably, approximately 40 to approximately 60. The base member 102 may also be constructed, in whole or in part, of a material other than the elastomer, such as a lightweight metal. The other material influencing, among other things, the color, texture, strength and/or rigidity of the base member 102. In some embodiments, the base member 102 is constructed of the same material used to construct the first sealing portion 106, the second sealing portion 108, and/or the third sealing portion 110.

On one side of the first attachment portion 104 there is attached material or a device for matingly engaging the second attachment portion 114. The material or device can include, but is not limited to, the hooks side of hook and loop fastening material (e.g., Velcro®), the loop side of loop hook and loop fastening material, magnet(s), glue, the stud side of snap fastener material, and the socket side of snap fastener material. The first attachment portion 104 generally comprises material or a device that is compatible for attaching or matingly engaging to complementary material or device on the second attachment portion 114. As such, the second attachment portion 114 is generally comprised of the second half of the attachment material or device used on the first attachment portion 104. Therefore, the second attachment portion 114 comprises material or device of one side that can include, but is not limited to, the hooks side of hook and loop fastening material (e.g., Velcro®), the loop side of hook and loop fastening material, magnet(s), glue, the stud side of snap fastener material, and the socket side of snap fastener material. The attachment of the first attachment portion 104 and the second attachment portion 114 may be a permanent attachment or a releasable attachment. In embodiments with a releasable attachment between the first attachment portion 104 and the second attachment portion 114, the first sealing member 100a and/or the second sealing member 100b may be replaceable or adjustable.

Referring back to FIG. 3, the first sealing portion 106 comprises a first surface 106a, a second surface 106b, a first side 106c, and a second side 106d. As represented in FIG. 3, the first surface 106a may be curved such that it intersects the first side 106c and the second surface 106b such that no distinct side is created. However, in other embodiments, a third side may divide the first and second surfaces 106a, 106b at the end opposite the first side 106c and the first side extension 106d. The first side 106c of the first sealing portion 106 is attached to the first side 102c of the base member 102. The first side extension 106d of the first sealing portion 106 extends along the same plane as the first side 106c, extending approximately the height of the first attachment portion 104.

As illustrated in FIG. 5, the first sealing portion 106 has a first width 506a along the second surface 106b, a first depth 506b along the first side 106c, and a second depth 506c along the first side extension 106d. As mentioned before, the first surface 106a may be curved such that it intersects the first side 106c and extends away from the first side 106c in an arc until it intersects the second side 106b. This is advantageous as it provides a smooth profile and transition to the exterior surface of the first object 116. In other embodiments, the first surface 106a is linear and does not arc. Overall, the first surface 106a has a depth of 506b plus 506c and a width of 506a. In other embodiments, the first surface 106a of the first sealing portion 106 extends linearly until it intersects with a third side, wherein the third side extends linearly to intersect with the second surface 106b, thereby forming a rectangular first sealing portion 106. The second side 106b of the first sealing portion 106 preferably is contoured so that all or a substantial portion of the surface of the second side 106b of the first sealing portion 106 is in contact with the exterior surface of the first object 116.

The first sealing portion 106 is preferably constructed of a resilient, yet flexible material. In certain embodiments, the first sealing portion 106 is constructed of an elastomer, such as an SBS rubber, polyurethane, polyisoprene (natural rubber), neoprene, polyisobuylene, vinyl, PVC or other plastic. The first sealing portion 106 provides support to, or is load sharing with, the base member 102 and in order to maintain the positioning of the first attachment portion 104. Therefore, the first sealing portion 106 must be constructed using an elastomeric material of sufficient hardness or durometer to support these components. Therefore, in certain embodiments, the first sealing portion 106 has a hardness described by procedure ASTM 2240 using the Shore A scale, wherein the hardness of the first sealing portion 106 is from approximately 30 to approximately 70, and, more preferably, approximately 40 to approximately 60. The first sealing portion 106 may also be constructed of a material other than the elastomer, such as a lightweight metal. In such embodiments, preferably the second surface 106b of the first sealing portion 106 is coated with an elastomeric material, or a layer of elastomeric material is attached to the second surface 106b, e.g., using an adhesive, to provide a surface that will seal with the exterior surface of the first object 116. The other material influences, among other things, the color, texture, strength and/or rigidity of the first sealing portion 106. In some embodiments, the material comprising the first sealing portion 106 is the same material comprising the base member 102, the second sealing portion 108, and/or the third sealing portion 110.

Referring back to FIG. 3, the second sealing portion 108 comprises a first surface 108a, a first side 108b, a second side 108c, a sealing end 108d, and an enclosure 108e. As illustrated in FIG. 3, the first surface 108a is generally planar and flush with the first surface 102a of the base member 102 and the first surface 110a of the third sealing portion 110 such that the three first surfaces 102a, 108a, and 110a form a substantially continuous surface of the first sealing member 100a. The first side 108a of the second sealing portion 108 is attached to the second side 102d of the base member 102. Additionally, the second side 108c of the second sealing portion 108 is attached to the first end 110c of the third sealing portion 110. In some embodiments, the second side 108c of the second sealing portion 108 is attached to the first side 110a of the third sealing portion 110 by an adhesive. In other embodiments, the second side 108c of the second sealing portion 108 and the first side 110a of the third sealing portion 110 are connected as a continuous section of material or, in other words, are integrally formed. The second sealing portion 108 also comprises a sealing end 108d that extends from the first side 108b, arcs away from the first surface 108a, and re-connects at the second side 108c, creating the enclosure 108e.

FIG. 6A illustrates one configuration of the second sealing portion 108, providing dimensional information. The second sealing portion 108 has a first width 608a along the first surface 108a; a first depth 608b along the first side 108b; a second depth 608c along the second side 108c; a third depth 608d between the center of the first surface 108a and the edge of the enclosure 108; a fourth depth 608e from the tip (furthest point away from the first surface 108a) of the sealing end 108d to the tip of the second side 108c; a fifth depth 608f across the middle of the enclosure 108e, a second width 608g across the middle of the enclosure 108e; and a first thickness 608h across the sealing end 108d. In some embodiments, the enclosure 108e is hollow, solely comprising air or some other gas or liquid. Such a hollow enclosure 108e can provide insulation to prevent energy transfer through the second sealing portion. Additionally, the hollow enclosure 108e also advantageously allows the sealing end 108 of the second sealing portion 108 to more easily engage and conform to the configuration of the gap 120 and the configuration of the edges of the first object 116 and second object 118 that the sealing end 108d engages. In other embodiments, the enclosure 108e is comprises a flexible and resilient solid material that can engage and conform to the configuration of the gap 120 and the configuration of the edges of the first object 116 and second object 118.

The second sealing portion 108 is preferably constructed of a resilient, yet flexible material. In certain embodiments, the second sealing portion 108 is constructed of an elastomer, such as an SBS rubber, polyurethane, polyisoprene (natural rubber), neoprene, polyisobuylene, vinyl, PVC or other plastic. The second sealing portion 108 is configured to seal the gap 120 between the first and second objects 116, 118. As such, the second sealing portion 108, especially the sealing end 108d, must be flexible enough to conform to the contour of the surfaces and edges of the gap 120 and first and second objects 116, 118, yet must be constructed of a material of sufficient hardness or durometer to apply a sealing force against such surfaces and edges in order to block air, light, odor, energy, and noise from passing through the gap 120. In one embodiment, the second sealing portion 108 is constructed of an elastomer having a hardness described by procedure ASTM 2240 using the Shore A scale, wherein the hardness of the second sealing portion 108 is from approximately 30 to approximately 70, and, more preferably, approximately 40 to 60. The second sealing portion 108 may also be constructed, in whole or in part, of other material to change the color, texture, strength and/or rigidity of the second sealing portion 108. In some embodiments, the second sealing portion 108 is constructed of the same material used to construct the first sealing portion 106, the base member 102, and/or the third sealing portion 110.

In embodiments where the enclosure 108e comprises a solid material instead of being hollow, the material within the enclosure 108e has a hardness that is equal to or less than the sealing end 108d. Such an embodiment provides the sealing end 108d more rigidity than when the enclosure 108e is comprised of air or fluid.

In some embodiments, the sealing end 108d is comprised of a softer material, according to the Shore A scale, than the rest of the second sealing portion 108 and/or the first sealing member 100a. As such, the rest of the second sealing portion 108 provides structural support for the sealing end 108d, and the sealing end 108d can more easily conform to the contours of the edges of the gap 120 and the first and second objects 116, 118, thus providing a more effective seal to the gap 120.

FIGS. 6B through 6D illustrate alternative configurations of sealing end 108d and the enclosure 108e of the second sealing portion 108. FIG. 6B illustrates one embodiment of the second sealing portion 108, wherein the depth 608g of the enclosure 108e is larger than the width 608h of the enclosure 108e. In such an embodiment, the sealing member 108 may more easily fit within the gap 120 and extend further into the gap as compared to a more rounded sealing end 108d, such as that illustrated in FIG. 3, thereby providing a more effective barrier for more narrow gaps. Similarly, FIG. 6C illustrates one embodiment of the second sealing portion 108 wherein the sealing end 108d and the enclosure 108e are configured in a substantially triangular configuration. In such an embodiment, the second sealing portion 108 may act as a wedge to more easily fit within the gap 120 and extend further into the gap as compared to the a more rounded sealing end 108d, such as that illustrated in FIG. 3, thereby providing a more effective barrier for more narrow gaps.

FIG. 6D illustrates another embodiment of the second sealing portion 108, having multiple enclosures 108e. This embodiment provides additional structural support to the interior of the sealing end 108d. Such an embodiment improves the sealing end's resistance to compression and provides a stronger seal to the gap 120. In some embodiments, this middle section of the sealing end 108d comprises a harder material than the rest of the sealing end 108d, such that middle section of the sealing end 108d maintains its configuration while the parts of the sealing end 108d closer to the first and second sides 108b, 108c of the second sealing portion 108 are softer and more malleable for conforming to the contours of the exterior surface and edges of the first and second objects 116, 118.

Referring to FIG. 3, the third sealing portion 110 comprises a first surface 110a, a second surface 110b, a first side 110c, and a second side 110d. The first surface 110a is generally flush with the first surface 108a of the second sealing portion 108, and extends away from the first surface 108a of the second sealing portion 108. The second surface 110b of the third sealing portion 110 is generally connected to the end of the second side 108c furthest away from the first surface 108a of the second sealing portion 108, and extends away from the second sealing portion 108. As mentioned previously, the first side 110c of the third sealing portion 110 is attached to the second side 108c of the second sealing portion 108. In some embodiments, the first side 110c of the third sealing portion 110 is attached to the second side 108c of the second sealing portion 108 by an adhesive. In other embodiments, the first side 110c of the third sealing portion 110 and the second side 108c of the second sealing portion 108 are connected as a continuous section of material or, in other words, are integrally formed. Finally, the second side 110d of the third sealing portion 110 extends between the first surface 110a and the second surface 110b of the third sealing portion 110. In some embodiments, the second side 110d of the third sealing portion 110 is linear side to the third sealing portion 110. In other embodiments, the second side 110d has a curvilinear configuration, generally arcing away from the first side 110c of the third sealing portion 110. In some embodiments (not shown), the distal end of the third sealing portion 110 can include a section between the second side 110d and the second surface 110b that is contoured so that all or a substantial portion of the section is in contact with the exterior surface of the second object 118 to provide a further seal to prevent the passing of air, noise, odor, energy, and light through the gap 120.

FIG. 7 illustrates one configuration of the third sealing portion 110, in accordance with one embodiment of the invention. As illustrated, the third sealing portion 110 comprises a first width 710a that denotes the distance that the third sealing portion 110 extends from the sealing member 108, specifically the total width distance between the first side 110c of the third sealing portion 110 and the second side 110d of the third sealing portion 110. The third sealing portion 110 also comprises a first depth 710b that denotes the distance that the second side 110d of the third sealing portion 110 extends away from the first surface 108a of the second sealing portion 108. The third sealing portion 110 may generally extend away from the first side 110c in a curvilinear configuration.

The third sealing portion 110 also comprises a second depth 710c along the first side 110c of the third sealing portion. Finally, the third sealing portion 110 also comprises a first thickness 710d that represents the distance between the first surface 110a and the second surface 110b. In some embodiments, the first thickness 710d is equal to the second depth 710c, such that the distance between the first and second surfaces 110a, 110b is uniform over the length of the third sealing portion 110. In other embodiments, the second depth 710c is larger than the first thickness 710 such that the thickness of the third sealing portion tapers downwardly as it extends away from the first side 110c. In one embodiment, the thickness of the third sealing portion tapers downwardly as it extends away from the first side 110c until the distance between the first and second surfaces 110a, 110b is equal to a predetermined first thickness, at which point the distance between the first and second surfaces 110a, 110b remains uniform for the remainder of the length of the third sealing portion 110, i.e., until the second side 110d is reached. In another embodiment, the thickness of the third sealing portion tapers downwardly as it extends away from the first side 110c until the distance between the first and second surfaces 110a, 110b is equal to a predetermined first thickness which is reached at the second side 110d.

FIG. 8A illustrates an "open" configuration of the sealing device 100 and FIG. 8B illustrates a "closed" configuration of the sealing device 100. As illustrated in FIG. 8A, the third sealing portion 110 does not engage the second object 118, and thus is in a disengaged position when the second object 118 is in the open position. As illustrated in the closed configuration of FIG. 8B, the third sealing portion 110 is engaged with the second object 118 along at least the second surface 110b and/or the second side 110d. A first force 850 is exerted on the third sealing portion 110 by the second object 118, causing the third sealing portion 110 to bend, give way, and/or compress, thus decreasing the distance of the first depth 710b. In other words, when the second object 118 is in the closed position, the surface of the second object 118 is in contact with at least a portion of the second surface 110b and/or the second side 110d creating a force against the third sealing portion 110. The elasticity and length of the third sealing portion 110 creates a spring-like bias against this force that firmly presses the portion of the second surface 110b and/or the second side 110d that is in contact with the second object 118 against the exterior of the second object 118. As the sealing device 100 is anchored to the first object 116, the hardness of the second sealing portion 108 and the third sealing portion 110 prevent the second side 110d of the third sealing portion 110 from completely giving way, and provides a reaction force (shown as second force 860) that is proportional to the first force 850. The stronger the first force 850, the stronger the second force 860, and stronger forces create a more effective seal between the third sealing portion 110 and the second object 118. As such, the third sealing portion 110 provides a sealing function similar to the second sealing portion 108 for trapping any air, light, noise, energy, or odor that manages to pass through the gap 120 within the space formed between the third sealing portion 110 and the second object 118. For example, if the length of the gap 120 is greater than the length of the first width 608a of the second sealing portion 108, then the second sealing portion provides a seal along the first object 116 and the third sealing portion 110 provides a seal against the second object 118. As the second sealing portion 108 and the third sealing portion 110 are connected, the combination of these two members 108, 110 provides a complete seal to block or restrict air, noise, light, energy, and odor from passing through the gap 120 or, to the extent it passes through the gap, to trap the air, light, noise, energy, or odor within the space formed between the third sealing portion 110 and the second object 118.

The third sealing portion 110 is preferably constructed of a resilient, yet flexible material. In certain embodiments, the third sealing portion 110 is constructed of an elastomer, such as an SBS rubber, polyurethane, polyisoprene (natural rubber), neoprene, polyisobuylene, vinyl, PVC or other plastic. The third sealing portion 110 is configured to aid in sealing the gap 120 between a first and second object 116, 118. Specifically, the third sealing portion 110 is designed to provide a seal between the second surface 110b and/or the second side 110d of the third sealing portion 110 and the second object 118. As such, the third sealing portion 110 must be flexible enough to contour along to most any edges or surfaces, yet hard or rigid enough to apply a reactionary second force 860 against such edges and block air, light, odor, energy, and noise from passing between the third sealing portion 110 and the second object 118. In one embodiment, the third sealing portion 110 has a hardness described by a procedure ASTM 2240 using the Shore A scale, wherein the hardness of the third sealing portion 110 is from approximately 30 to approximately 70, and, more preferably, approximately 40 to 60. The third sealing portion 110 may also be constructed, in whole or in part, of a material other than the elastomer, such as a lightweight metal. In such embodiments, preferably the second surface 110b and/or the second side 110d of the third sealing portion 110 is coated with an elastomeric material, or a layer of elastomeric material is attached to the second surface 110b and/or the second side 110d of the third sealing portion 110, e.g., using an adhesive, to provide a surface that will seal with the exterior surface of the second object 118. The other material influences, among other things, the color, texture, strength and/or rigidity of the third sealing portion 110. In some embodiments, the material comprising the third sealing portion 110 is the same material comprising the first sealing portion 106, the base member 102, and/or the second sealing portion 108.

FIG. 9 illustrates a cross-cut view of the backing member 112, in accordance to an embodiment of the invention. As illustrated, the backing member 112 comprises a first surface 112a, a second surface 112b, a first side 112c, and a second side 112d. The first surface 112a may comprise an adhesive such that the first surface may attach to a first object 116. In some embodiments, the adhesive of the first surface 112a is a glue or other tacky substance. As such, a wax paper coating or other covering may cover the first surface 112a such that the first surface 112a retains its tacky qualities until a user removes the covering to apply the first surface 112a to the first object 116. The second surface 112b of the backing member 112 is secured to the second attachment portion 114. In some embodiments, the second surface 112b may be secured to the second attachment portion 114 by means of an adhesive, staples, sewing, and the like. The first side 112c of the backing member 112 separates the first and second surfaces 112a and 112b, and generally abuts at least a portion of the second side 106d of the first sealing portion 106 when the device 100 is in an engaged position, as illustrated in FIG. 2. The second side 112d separates the first and second surfaces 112a and 112b, and generally abuts at least a portion of the sealing member 108 when the device 100 is in an engaged position, as illustrated in FIG. 2.

FIG. 10 illustrates a top perspective view of the first sealing member 100a, according to one embodiment of the invention. The first sealing member 100a may generally be any length L. For example, the length L may be the distance around the perimeter of a door, window, garage door, air vent, or other enclosure and the frames of such objects, such that the sealing device 100 may generally provide a seal around an entire object, or a portion thereof.

FIG. 11 is a bottom view illustrating a first sealing member 100a, according to one embodiment of the invention. As previously mentioned, the length L may be the distance around a first object, or a portion thereof.

FIG. 12A illustrates a top view of the backing member 112, according to one embodiment of the invention. As illustrated, the backing member 112 is positioned behind the second attachment portion 114, such that the second attachment portion 114 is free to engage the first attachment portion 104. FIG. 12B illustrates a bottom view of the backing member 112, according to one embodiment of the invention. As illustrated, the first surface 112a covers the bottom of the backing member 112. As previously mentioned, the length L may be the distance around a first object, or a portion thereof.

FIG. 13 illustrates a cut-away view illustrating an alternate configuration of the sealing device 100. As illustrated in FIG. 13, the first sealing portion 106 comprises a third side 106e, positioned between the first and second surfaces 106a, 106b and the first and second sides 106c, 106d. As such, the first sealing portion 106 is configured substantially in a rectangular configuration. Such an embodiment provides simplicity to the manufacturing process because a rectangular first sealing portion 106 is easier to produce than a curved first sealing portion 106, and the device 100 may be more cost-effective to produce as a result.

As illustrated in FIG. 13, the third sealing portion 110 is substantially linear, extending away from the first surface 108a of the sealing member 108 at an angle Θ. Such an embodiment provides simplicity to the manufacturing process because a straight third sealing portion 110 is easier to produce than a curved third sealing portion 110, and the device 100 may be more cost-effective to produce as a result. In an embodiment (not shown), the distal end of the third sealing portion 110 can include a section between the second side 110d and the second surface 110b that is contoured so that all or a substantial portion of the section is in contact with the exterior surface of the second object 118 to provide a further seal to prevent the passing of air, noise, odor, energy, and light through the gap 120.

Referring to FIG. 14, there is illustrated one preferred first sealing member 100a, according to the present invention setting forth the dimensions, in inches, of the first sealing member 100a.

The device 100 may be packaged as a kit, the kit comprising one or more spools of the first sealing member 100a, one or more spools of the second sealing member 100b, and a jig.

In embodiments of the kit wherein the first and second sealing members 100a, 100b are packaged in spools, the material comprising the first and second sealing members 100a, 100b must be sufficiently soft to allow the sealing members 100a, 100b to be coiled and uncoiled without substantially losing the general structural integrity and configuration of the device 100. Therefore, the first and second sealing members 100a, 100b have a hardness described by procedure ASTM 2240 using the Shore A scale, wherein the overall hardness of the first and second sealing members 100a, 100b are from approximately 30 to approximately 70, and, more preferably, approximately 40 to approximately 60. Of course, certain elements within the first and second sealing members 100a, 100b may be comprised of material with different hardness values, but the overall hardness must meet the requirements specified above. For example, the base member 102 may have a hardness of 55 while the sealing member has a hardness of 50, but the overall hardness is no more than 70, so the first sealing member 100a is still capable of coiling. Additionally, the first and second attachment portions 104, 114, must be flexible enough to coil in substantially the same manner as the first and second sealing members 100a and 100b, respectively.

The jig provided in the kit may be any cutting tool (e.g., knife, scissors, etc.) capable of cutting through the first sealing member 100a and the second sealing member 100b. To satisfy this requirement, the jig must be capable of cutting through a material with a hardness of 70 or less. Additionally, the jig must be capable of cutting through the first and second attachment materials 104, 114. Supplying the jig as part of the kit provides a means to the user to customize the dimensionality of the sealing device 100, especially with respect to the length L. For example, the device may be cut such that the length L is the distance across one edge of a door. Remaining parts of the sealing device 100 may be cut to match the lengths of the remaining sides of the same door, such that the entire perimeter of the door may be covered by the device. In some embodiments, the jig is capable of cutting the sealing device 100 at an angle such that the sealing device 100 may sufficiently cover one or more corners. Additionally, the jig may be capable of cutting sections of the second sealing portion 108 and/or the third sealing portion 110 such that the sealing device 100 may fit over and/or around non-flat edges, such as a latch plate, a hinge plate, or a door stop.

In some embodiments, the kit comprises pre-cut strips of the first and second sealing members 100a, 100b. In such embodiments, the first and second sealing members 100a and 100b do not necessarily need to be comprised of material soft enough to bend into coils.

In some embodiments of the invention, the second sealing member 100b may be configured such that a user may cut the second sealing member 100b into a custom length L to fit at least a portion of a first object 116, such as a door or a window. The second sealing member 100b may then be affixed to the edge of the first object 116 such that the second sealing member 100b is held in place. Continuing the example, the first sealing member 100a may then be cut into the same dimensions as the second sealing member 100a. The first sealing member 100a may be configured such that when the first sealing member 100a overlays the second sealing member 100b, the second attachment portion 114 aligns with the first attachment portion 104, and the sealing member 108 and the third sealing portion 110 extend across at least a portion of the gap 120 between the first object 116 and a second object 118 (such as a door frame or window frame). The first attachment portion 104 and the second attachment portion 114 may be configured such that when the two are engaged, the first sealing member 100a and the second sealing member 100b are held together with enough force that ordinary door and window movements do not separate the sealing device 100. Additionally, the first sealing member 100a may be configured to be replaceable, such that the sealing device 100 is capable of being separated after the first and second attachment portions 104, 114 are engaged. As such, a new or different first sealing member 100a, having a similar or different configuration, may be attached to the second sealing member without having to re-apply an adhesive member to first object 116.

In some embodiments of the invention, the sealing device 100 may comprise a covering that extends across the first surface 106a of the first sealing portion 106, the first surface 102a of the base member 102, the first surface 108a of the second sealing member 108, and the first surface 110a of the third sealing portion 110. The covering may be comprised of any material that sufficiently covers, the first sealing member 100a, and may provide certain functions like protecting the material that comprises each part of the first sealing member 100a. The covering may also provide coloring to the first sealing member 100a. For example, the covering may be of a color substantially similar to the first object 116 (to which the device is attached), such that the device discretely blends into the first object 116. Additionally, the covering may comprise a design or motif to present a trademark or other design mark such as wood paneling or the like.

In some embodiments, the material comprising each member of the sealing device 100 may also contain protective qualities, such that the device provides protection to and from the edges and corners of the first object 116. For example, the sealing device 100 may protect the edges of a door or window from receiving scratches or damage. Additionally, the sealing device 100 may protect other objects or body parts from being damaged or injured by the corners and/or edges of a door. As such, the sealing device 100 may act as a barrier between the edges of a first object 116 and external objects, even when the device is not in a closed or sealed orientation.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A device for sealing an aperture defined between a first object and second object, the device comprising:
    a first sealing member, the first sealing member comprising:
        a base member comprising first and second sides and a surface extending between the first and second sides;
        a first sealing portion extending from the first side of the base member;
        a first attachment portion extending along at least a portion of the surface;
        a second sealing portion extending from the second side of the base member, the second sealing member being configured to conform to and seal a gap; and
        a third sealing portion, the third sealing portion extending from the second sealing portion, the third sealing portion defining a distal end structured to conform to and form a seal an exterior surface of the second object;
    a second sealing member, the second sealing member comprising:
        a backing member comprising a first and second surface, wherein the first surface comprises an adhesive structured to attach to the first object; and
        a second attachment portion, wherein the second attachment portion extends along at least a portion of the second surface of the backing member, and wherein the second attachment portion is configured to matingly engage the first attachment portion to thereby secure the first sealing member to the second sealing member and to thereby sealing engage the second sealing portion at least partially within the gap and sealing engage distal end of the third sealing member with the exterior of the second object.

2. The device according to claim 1, wherein the second sealing portion comprises an enclosure, and wherein the enclosure defines a width and a depth, and wherein the width of the enclosure is greater than the depth of the enclosure.

3. The device according to claim 1, wherein the second sealing portion comprises an enclosure, and wherein the enclosure defines width and a depth, and wherein the width of the enclosure is less than or equal to the depth of the enclosure.

4. The device according to claim 1, wherein the second sealing portion comprises an enclosure and a sealing end, and wherein the sealing end of the second sealing portion comprises a substantially triangular configuration.

5. The device according to claim 1, wherein the second sealing portion comprises a plurality of enclosures.

6. The device according to claim 1, wherein the second sealing portion comprises an enclosure, wherein the enclosure is comprised of a solid material.

7. The device according to claim 1, wherein the first and second attachment portions comprise hook and loop fasteners.

8. The device according to claim 1, wherein the third sealing portion extends away from the second sealing portion in an arcing configuration.

9. The device according to claim 1, wherein the third sealing portion extends away from the second sealing portion in a substantially linear configuration.

10. The device according to claim 1, wherein the first sealing portion and the base member comprises an elastomeric region, wherein the elastomeric region has a hardness on the Shore A scale, wherein the hardness of the elastomeric region is from approximately 40 to approximately 60.

11. The device according to claim 1, wherein the second sealing portion comprises an elastomeric region, wherein the elastomeric region has a hardness on the Shore A scale, wherein the hardness of the elastomeric region is from approximately 40 to approximately 60.

12. The device according to claim 1, wherein the third sealing portion comprises an elastomeric region, wherein the elastomeric region has a hardness on the Shore A scale, wherein the hardness of the elastomeric region is from approximately 40 to approximately 60.

13. The device according to claim 1, wherein the base member comprises a first elastomeric region, the sealing member comprises a second elastomeric region, wherein the first elastomeric region and the second elastomeric region each have a hardness on the Shore A scale, wherein the hardness of the first and second elastomeric regions are from approximately 40 to approximately 60, and wherein the hardness of the first elastomeric region exceeds the hardness of the second elastomeric region.

14. The device according to claim 1, wherein the base member comprises a first elastomeric region, the third sealing portion comprises a second elastomeric region, wherein the first elastomeric region and the second elastomeric region each have a hardness on the Shore A scale, wherein the hardness of the first and second elastomeric regions are from approximately 40 to approximately 60, and wherein the hardness of the first elastomeric region exceeds the hardness of the second elastomeric region.

15. The device according to claim 1, wherein the first sealing portion, the base member, the second sealing portion, and the third sealing portion comprise a single elastomeric region, wherein the elastomeric region has a hardness on the Shore A scale, wherein the hardness of the elastomeric region is from approximately 40 to approximately 60, and wherein the hardness of the elastomeric region is uniform.

16. The device according to claim 1, further comprising a covering along at least a portion of the first surface of the first sealing portion, a first surface of the base member, or a first surface of the third sealing portion.

17. The device according to claim 16, wherein the covering comprises a design or coloring simulating an exterior surface of the first object.

18. The device according to claim 16, wherein the covering comprises a predetermined design or coloring motif.

19. A method of packaging a sealing device, the method comprising:
provides a kit, the kit comprising:
a device for sealing an aperture defined between a first object and second object according to claim 1; and
a jig, wherein the jig comprises a tool for cutting the first and second sealing members into a custom configuration.

20. A method of packaging a sealing device according to claim 19, wherein the kit comprises a first spool that retains the first sealing member and a second spool that retains the second sealing member.

\* \* \* \* \*